United States Patent [19]
Ellis

[11] Patent Number: 5,184,231
[45] Date of Patent: Feb. 2, 1993

[54] HELMET SYSTEMS

[75] Inventor: Stafford M. Ellis, East Preston, England

[73] Assignee: GEC-Marconi Limited, England

[21] Appl. No.: 35,042

[22] Filed: Mar. 19, 1987

[30] Foreign Application Priority Data

Mar. 26, 1983 [GB] United Kingdom ............... 8607586
Mar. 22, 1986 [GB] United Kingdom ............... 8607162

[51] Int. Cl.⁵ .................... G02B 27/64; A42B 3/00
[52] U.S. Cl. .................................. 359/13; 359/815; 2/6
[58] Field of Search ............. 350/500; 359/13, 815; 2/6

[56] References Cited

U.S. PATENT DOCUMENTS

| | | | |
|---|---|---|---|
| 3,787,109 | 1/1974 | Vizenor | 2/6 X |
| 3,923,370 | 12/1975 | Mostrom | 350/174 X |
| 4,449,787 | 5/1984 | Burbo et al. | 350/549 X |
| 4,465,347 | 8/1984 | Task et al. | 350/547 X |
| 4,468,101 | 8/1984 | Ellis | 350/547 X |
| 4,563,061 | 1/1986 | Ellis | 350/503 |
| 4,670,912 | 6/1987 | Hart | 2/6 X |

FOREIGN PATENT DOCUMENTS

| | | | |
|---|---|---|---|
| 2155762 | 10/1985 | United Kingdom | 2/6 |
| 2168595 | 6/1986 | United Kingdom | 2/6 |

Primary Examiner—Mark Hellner
Attorney, Agent, or Firm—Kirschstein, Ottinger, Israel & Schiffmiller

[57] ABSTRACT

A helmet system comprising a helmet (11), a vizor (13) pivotally mounted on the helmet, and mounted on the vizor (13), an electro-optical system, e.g. a night vision goggle, including an eyepiece (33) positioned between a transparent part (19) of the vizor and the user's eye so as to provide the user with a view of a scene forward of the user through the eyepiece, the eyepiece also serving as a combiner to provide the user with a virtual image of a display produced by the electro-optical system superimposed on his view of the forward scene through the eyepiece.

7 Claims, 2 Drawing Sheets

HELMET SYSTEMS

BACKGROUND OF THE INVENTION

This invention relates to helmet systems.

More particularly the invention relates to helmet systems of the kind comprising a helmet and a vizor which is angularly displaceable with respect to the helmet about a transverse axis fixed with respect to the helmet.

Such helmet systems, especially when for use in combat aircraft, frequently also include an electro-optical system including a combiner eyepiece through which a user of the helmet system is able to view a scene forward of the user and which serves to reflect light rays derived from a display surface of the electro-optical system to provide the user with a virtual image of the display surface superimposed on his view of the forward scene through the eyepiece.

The electro-optical system typically comprises a night vision system providing an intensified image of the forward scene. However the electro-system may additionally or alternatively display other data, for example flight data in the case of a helmet system for use in an aircraft.

It is sometimes desirable for the helmet system user to be able to use the vizor and the electro-optical system simultaneously, and this can present considerable difficulty in respect of mounting the vizor and the electro-optical system on the helmet.

OBJECT OF THE INVENTION

It is an object of the present invention to provide a helmet system wherein this difficulty is overcome.

According to the present invention in a helmet system comprising: a helmet; a vizor which is angularly displaceable with respect to the helmet about a transverse axis fixed with respect to the helmet; and an electro-optical system including a combiner eyepiece through which a user of the helmet system is able to view a scene forward of the user and which serves to reflect light rays derived from a display surface of the electro-optical system to the user to provide the user with a virtual image of the display surface superimposed on his view of the forward scene through the eyepiece; the electro-optical system is mounted on the said vizor so as to be angularly displaceable therewith about said transverse axis, and so that said eyepiece is positioned, when the vizor is in use, between a transparent part of the vizor and an eye of the user.

Preferably said vizor includes an upper structural part which extends part way round the helmet at each side thereof, said transverse axis extending through portions of said structural part at the sides of the helmet; and said electro-optical system is mounted on a lower transparent part of the vizor which is dependent from said structural part.

Preferably a positive detent means is provided between said vizor and said helmet whereby the vizor may be secured with respect to the helmet in any selected one of at least two positions angularly displaced about said transverse axis. In such an arrangement the transverse axis is preferably fixed in the helmet so that the clearance between a user's eye position and the eyepiece is substantially the same at each vizor position defined by the detent means.

Preferably the vizor is mounted on the helmet by pivot arrangements such that the vizor, together with the electro-optical system, is manually releasable from the helmet.

In one particular embodiment of the invention the electro-optical system comprises a night vision system having a forward projecting portion which projects through an aperture in said vizor.

One helmet system in accordance with the invention will now be described, by way of example, with reference to the accompanying drawings in which:

DESCRIPTION OF PREFERRED EMBODIMENT

Figure 1:
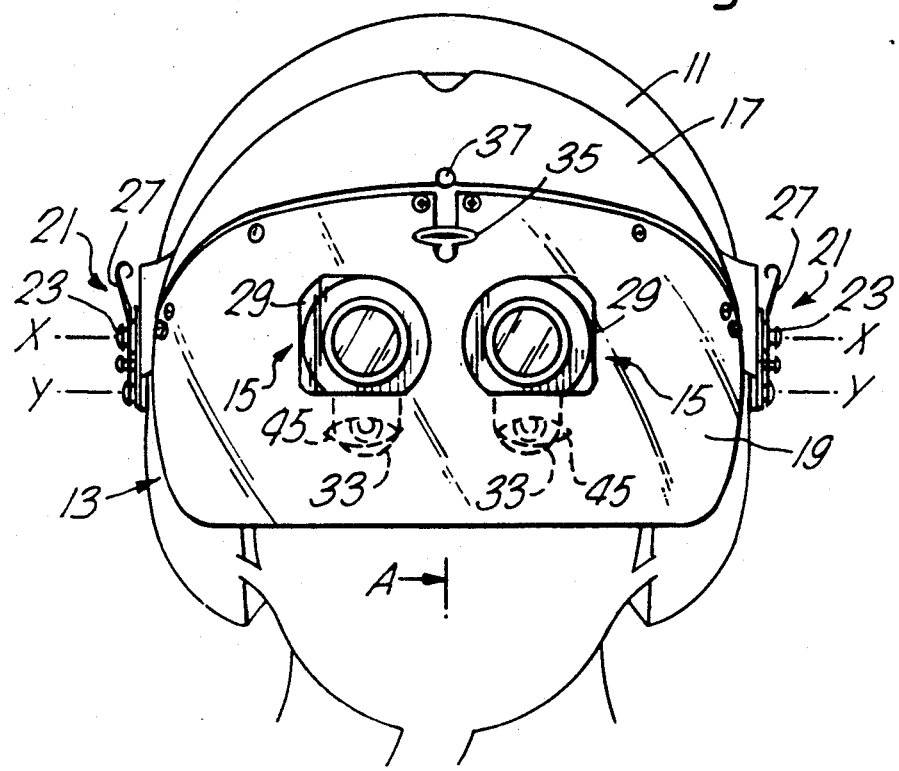
FIG. 1 is a front view of the helmet system.
Figure 2:
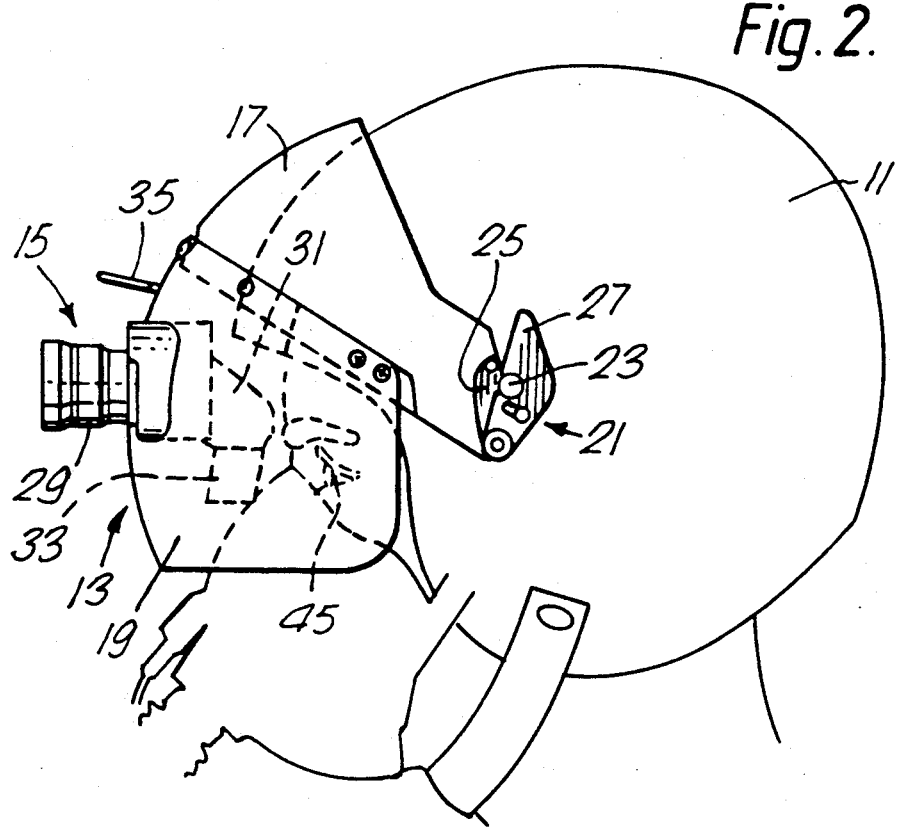
FIG. 2 is a side view of the helmet system.
Figure 3:
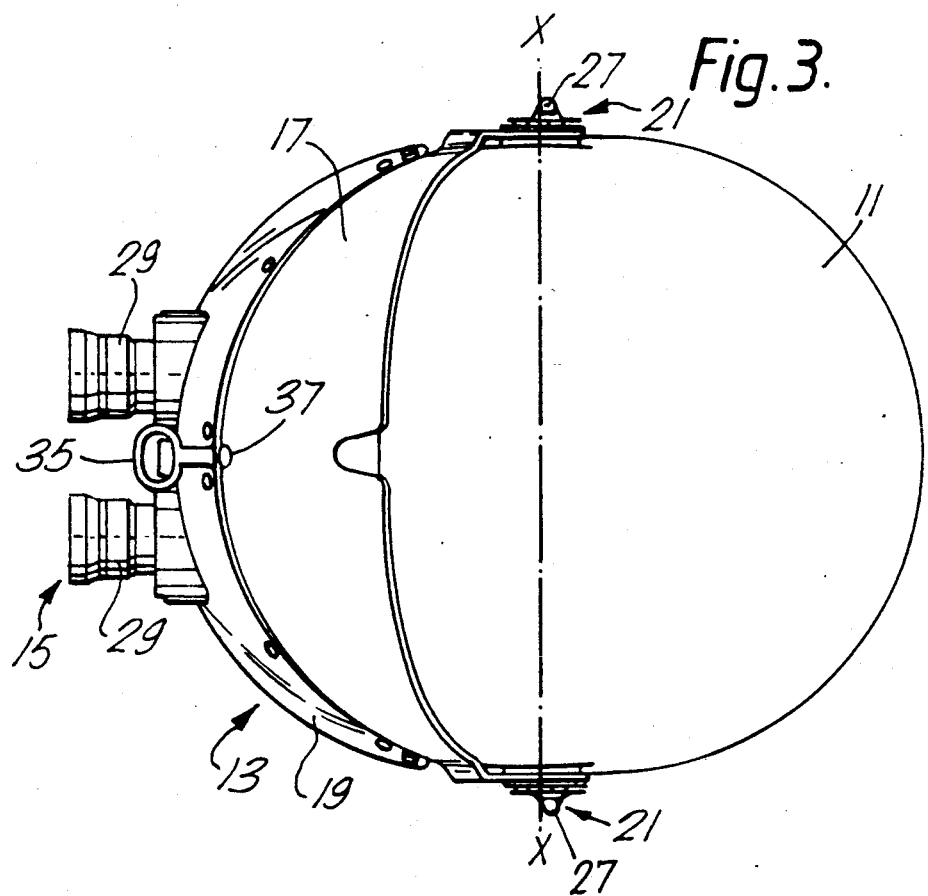
FIG. 3 is a plan view of the helmet system.

Referring the drawings, the helmet system comprises a helmet 11, a vizor 13 which is mounted on the helmet 11 for angular displacement about a transverse axis X—X fixed in the helmet 11, and an electro-optical system in the form of a night vision goggle 15 mounted on the vizor 13.

The vizor 13 comprises a cowl-shaped upper structural part 17 of reinforced plastic material and a transparent lower part, 19, also of a plastic material, secured to the part 17 by screws. The vizor extends part way around the helmet at each side thereof and the structural vizor part 17 is connected to the helmet 11 by pivot arrangements 21, one at each side of the helmet 11.

The pivot arrangements 21 each comprise a pivot pin 23 fixed in the outer skin of the helmet 11 with its longitudinal axis aligned with the transverse axis X—X, and a plate 25 connected to the structural vizor part 17. Each plate 25 is formed with a notch in which the associated pivot pin 23 locates, the pin 23 being retained in the notch by a catch 27 pivoted to the plate 25 on an axis Y—Y. The catches 27 thus serve as quick release catches operation of which permits the removal of the vizor 13 from the helmet 11, together with the night vision goggle 15 carried thereby.

The user of the helmet system, instead of mounting the complete helmet system on his head, can thus first fit the helmet 11 and then attach the vizor 13 to the helmet 11 using the releasable catches 27. Apart from this, the release of the vizor 13 using the catches 27 gives ready access to the night vision goggle 15 to assist in the maintenance of the helmet system.

The night vision goggle 15, which is of a form described in U.S. Pat. No. 4,563,061 filed in the name of Stafford Malcolm Ellis on the Jul. 23, 1984 which is hereby incorporated by reference, is of the binocular type and thus has a separate electro-optical system for each eye of the user.

In respect of each eye the goggle 15 has a forward projecting portion 29 which projects through, and is secured within an aperture in the transparent part 19 of the vizor 13. Within each portion 29 there is housed an objective lens (not shown) and an image intensifier (not shown). Behind each portion 29 there is a portion 31 which houses a roof prism (not shown), and below each portion 31 there is a collimating eyepiece 33. Each eyepiece 33 is positioned in front of a respective eye position 45 of the user to provide the user with a view through the eyepiece 33 of the scene forward of the user. In addition, each eyepiece 33 serves to reflect to the user light rays derived by way of the associated roof prism from an image of the forward scene produced by the image intensifier, thereby to provide the user with an intensified virtual image of the forward scene superimposed on his direct view of the scene through the eyepiece 33.

It will be appreciated that for comfort, and according to personal disposition, the angular position of the helmet shell with respect to the user's head varies from person to person. To accommodate such variation the system incorporates positive detent means permitting the vizor 13, and hence the night vision goggle eyepieces 33, to be incrementally angularly adjustable about the vizor pivot axis X—X.

Figure 4:
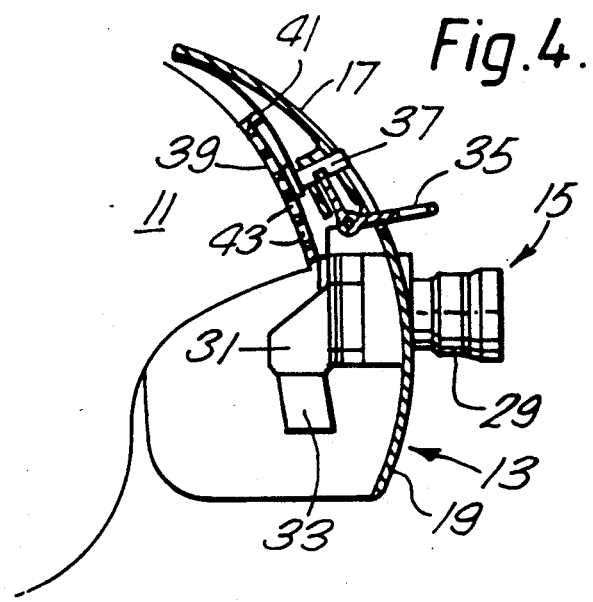
FIG. 4 is a scrap sectional view on the section A—A of FIG. 1.

As shown, with particular reference to FIG. 4, the positive detent means comprises a latch member 35 pivotally mounted on the vizor structural part 17 at a bottom margin portion thereof, a latch pin 37 engaged by the latch member 35 and slidable in a passage in the said margin portion of the vizor part 17, an indexing plate 39 secured to the front of the helmet 11, and a leaf spring 41 which urges the pin 37 towards the plate 39.

The indexing plate 39 has a multiplicity of apertures 43 selectively engageable by the pin 37 in dependence upon the angular position of the vizor 13. The user adjusts the position of the vizor 13 so as to bring the eyepieces 33 to the correct position in relation to his line of sight by using the latch member 35 to release the latch pin 37 from engagement with the indexing plate 39 at an aperture 43, and angularly moving the vizor 13 to a position at which the latch pin 37 is engageable with the appropriate aperture 43. The transverse axis X—X is positioned in the helmet 11 so that the clearance between the eyepieces 33 and the user's eye position 45 is substantially the same at each vizor position defined by the detent means.

I claim:

1. A helmet system comprising: a helmet; a vizor which is angularly displaceable with respect to the helmet about a transverse axis fixed with respect to the helmet; and an electro-optical system including a combiner eyepiece through which a user of the helmet system is able to view a scene forward of the user and which serves to reflect light rays derived from a display surface of the electro-optical system to the user to provide the user with a virtual image of the display surface superimposed on his view of the forward scene through the eyepiece; and wherein the electro-optical system is mounted on the said vizor so as to be angularly displaceable therewith about said transverse axis, and so that said eyepiece is positioned, when the vizor is in use, between a transparent part of the vizor and an eye of the user.

2. A system according to claim 1 wherein said vizor includes an upper structural part which extends part way round the helmet at each side thereof, said transverse axis extending through portions of said structural part at the sides of the helmet; and said electro-optical system is mounted on a lower transparent part of the vizor which is dependent from said structural part.

3. A system according to claim 1 wherein a positive detent means is provided between said vizor and said helmet whereby the vizor may be secured with respect to the helmet in any selected one of at least two positions angularly displaced about said transverse axis.

4. A system according to claim 3 wherein said transverse axis is fixed in the helmet so that the clearance between a user's eye position and the eyepiece is substantially the same at each vizor position defined by the detent means.

5. A system according to claim 1 wherein said vizor is mounted on the helmet by pivot arrangements such that the vizor, together with the electro-optical system, is manually releasable from the helmet.

6. A system according to claim 1 wherein said electro-optical system comprises a night vision system.

7. A system according to claim 6 wherein said night vision system has a forward projecting portion which projects through and is secured within an aperture in said vizor.

* * * * *